Aug. 10, 1954 W. J. HALLER 2,685,911
PACKAGE HAVING COVER CRIMP-SEALED THERETO
AND METHOD OF AND APPARATUS FOR MAKING IT
Filed June 6, 1951 3 Sheets-Sheet 1
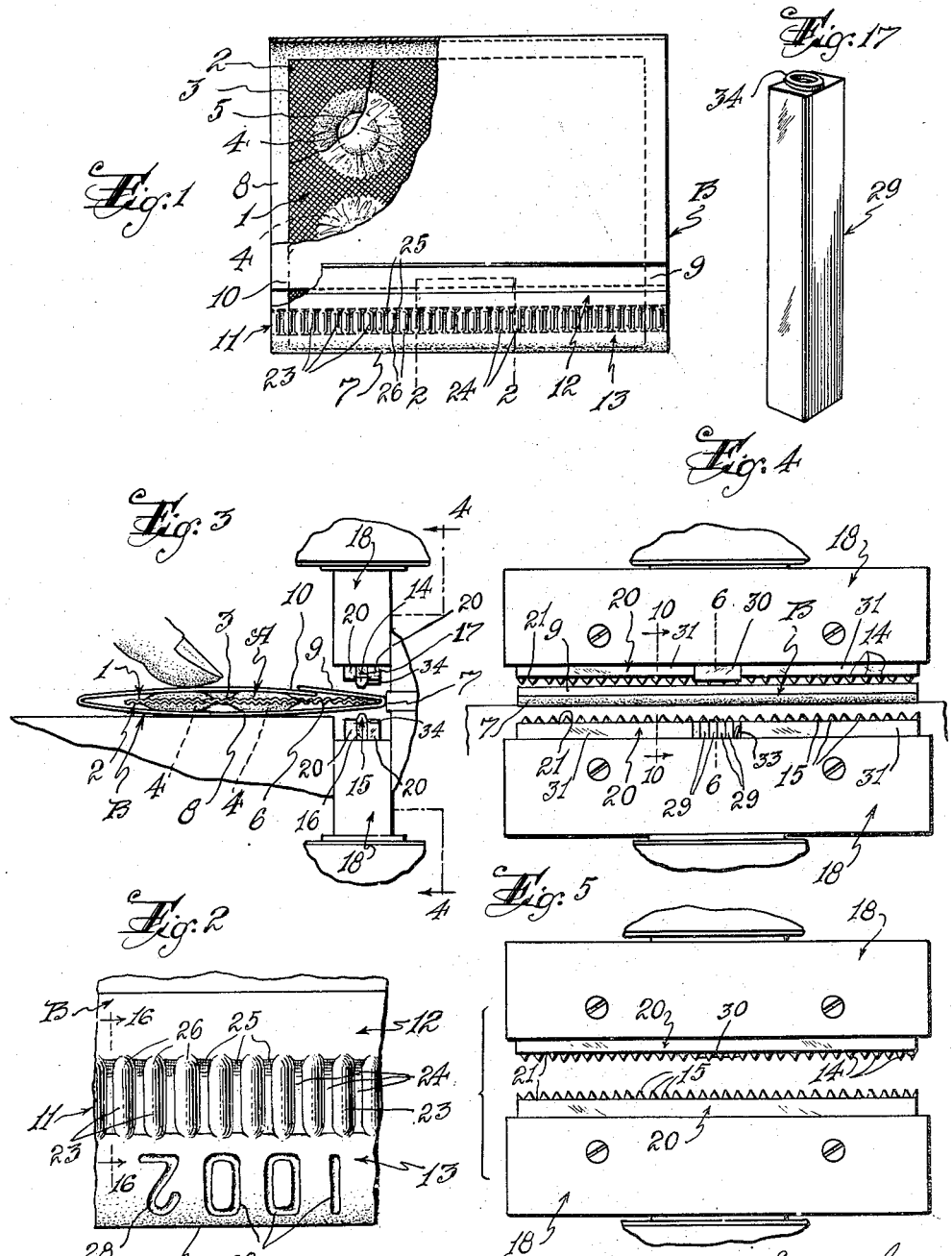
Inventor:
William J. Haller,
BY Harry J. Rook,
Attorney.

Aug. 10, 1954   W. J. HALLER   2,685,911
PACKAGE HAVING COVER CRIMP-SEALED THERETO
AND METHOD OF AND APPARATUS FOR MAKING IT
Filed June 6, 1951   3 Sheets-Sheet 2
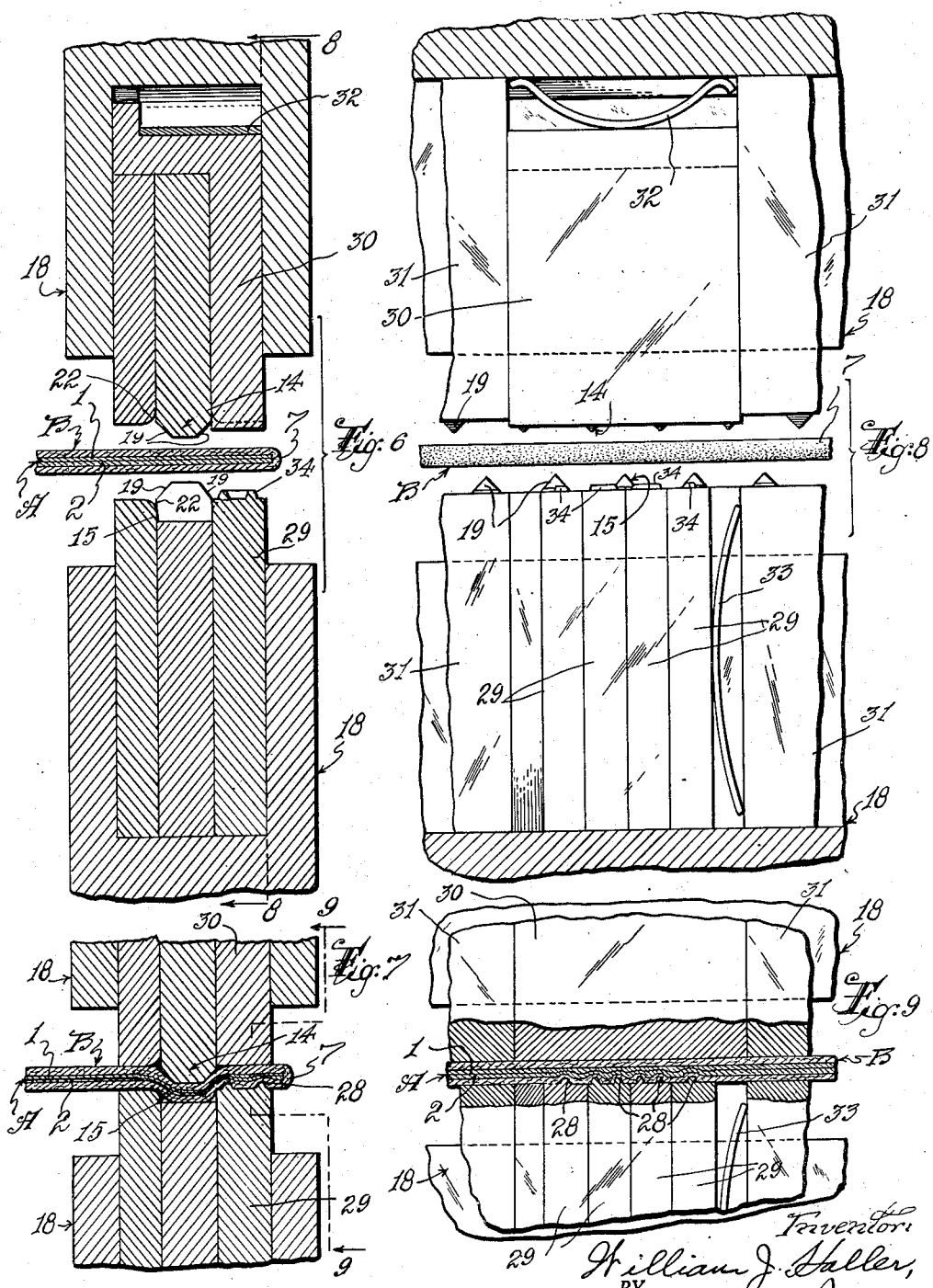

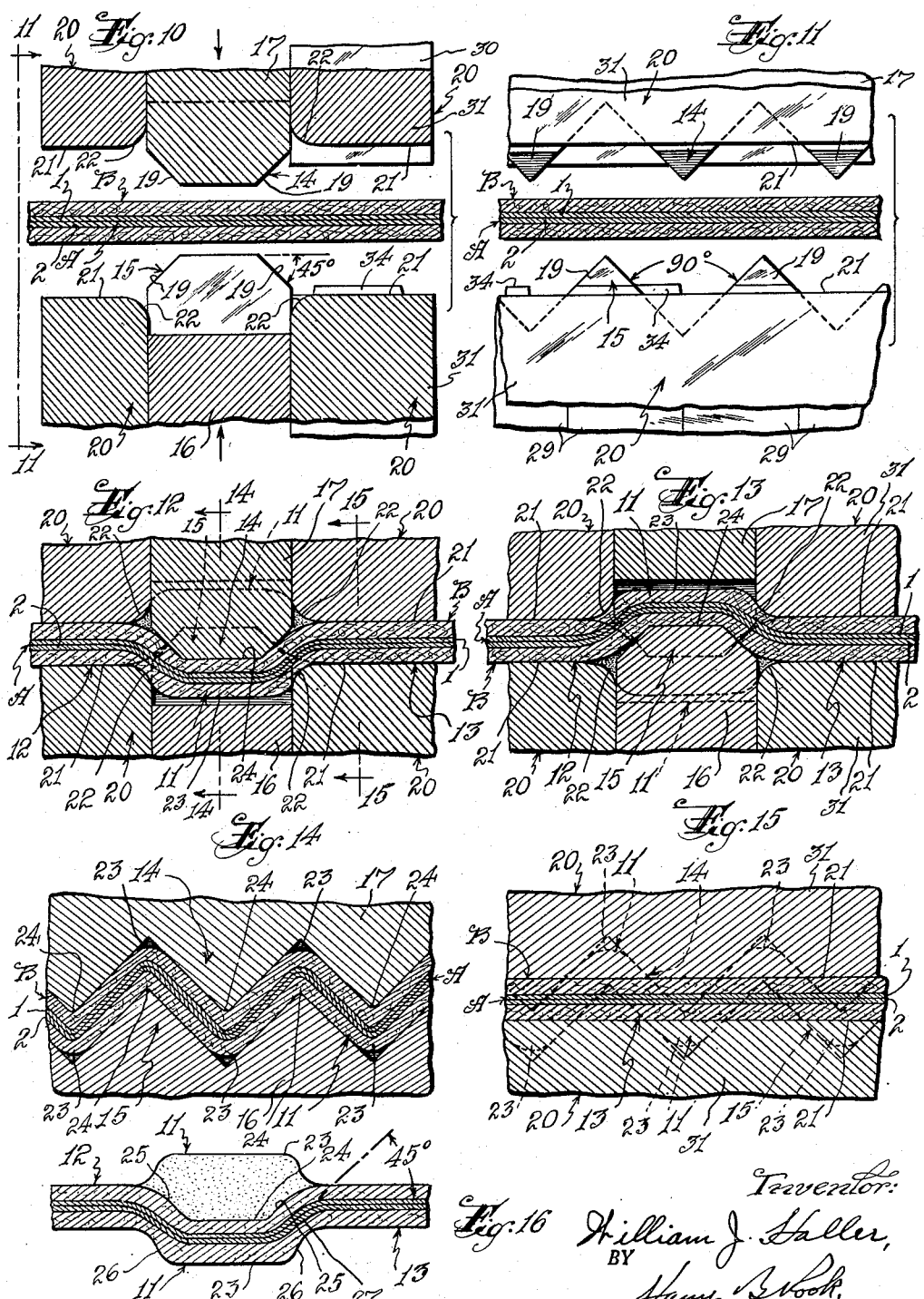

Patented Aug. 10, 1954

2,685,911

UNITED STATES PATENT OFFICE 2,685,911

PACKAGE HAVING COVER CRIMP-SEALED THERETO AND METHOD OF AND APPARATUS FOR MAKING IT

William J. Haller, Livingston, N. J., assignor to Ivers-Lee Company, Newark, N. J., a corporation of Delaware Application June 6, 1951, Serial No. 230,180

5 Claims. (Cl. 154—42)

1

This invention relates in general to the crimp-sealing of sheets of material together and more particularly to packages formed of thin flexible approximately flat walls of sheet material such as "Cellophane," rubber hydrochloride, metal foil and the like, sealed or bonded together in zones which form the margins or boundaries of a commodity compartment between said layers in which a commodity, for example tablets, pills, liquid or powdered material is packaged, and which are attached to or have attached to them relatively thick and stiff cover sheets or labels, for example as shown in Salfisberg Patents Nos. 2,457,924, dated January 4, 1949, and 2,325,021 dated July 20, 1943.

In known packages of the type described, the cover sheets or labels are adhesively secured to the flexible walls, either the walls being thermoplastic or having thermoplastic or adhesive coatings, or the cover sheets having thermoplastic or adhesive coatings; and generally the various layers or thicknesses of material are interdigitated, crimped or corrugated. However, known methods and apparatus for making packages of this general nature are incapable of producing a satisfactory package where the cover sheet or label is of substantial thickness and toughness, because it has not been possible to produce an interdigitated or crimped seal that will securely hold the "cellophane" or foil package against detachment from the cover or vice versa. Nevertheless, heavy, thick and tough cover sheets or labels are desirable if not necessary to serve as adequate support and protection against injury of "cellophane" or foil packages in which heavy or bulky commodities are packaged.

Therefore, a prime object of the present invention is to provide a novel and improved crimped seal between layers of material and method and apparatus for making such a seal, particularly in a package structure, whereby a thick, heavy and tough cover or label sheet can be firmly crimp-sealed to other layers of sheet material or to a package formed of for example "cellophane," rubber hydrochloride or metal foil so as to reduce to the minimum the possibility of accidental separation of said cover sheet and said layers of sheet material or package from each other.

Another object is to provide a package of this character wherein the layers of material of which the package and cover are formed shall be crimped or interdigitated in a novel and improved manner to ensure secure interlocking of the layers together.

2

Another object is to provide a novel and improved seal which shall include crimped portions and flat uncrimped portions arranged in predetermined relation to each other so that the crimped portions shall produce a firm interlocking of the layers of material and the flat or uncrimped portions shall reduce to the minimum strains imposed with a peeling action upon the crimped portions tending to pull the crimped portions of juxtaposed layers apart.

In the packaging of certain commodities, particularly pharmaceuticals, it is desirable to provide code numbers on the packages for identification purposes, and another object of the invention is to provide a novel and improved method and apparatus for embossing or printing code indicia on the cover sheets or labels such as have been hereinbefore described.

Still another object is to provide apparatus embodying a novel arrangement of jaws for simultaneously crimp-sealing and flat sealing layers of material together and embossing indicia into said layers.

Other objects, advantages and results of the invention will be brought out by the following description in conjunction with the accompanying drawings in which:

Figure 1 is a plan view of one type of package embodying the invention;

Figure 2 is a greatly enlarged plan view of the zone of the package designated 2—2 on Figure 1;

Figure 3 is a schematic side elevational view of the cooperating jaws of a press for sealing the layers of the package together and embossing indicia thereon;

Figure 4 is a rear elevation approximately on the plane of the line 4—4 of Figure 3;

Figure 5 is a front elevational view of the jaws from the side thereof opposite that shown in Figure 4;

Figure 6 is a greatly enlarged fragmentary transverse sectional view approximately on the plane of the line 6—6 of Figure 4, showing the jaws in spaced or open relation;

Figure 7 is a similar view showing the jaws in closed relation;

Figure 8 is a fragmentary vertical longitudinal sectional view approximately on the plane of the line 8—8 of Figure 6;

Figure 9 is a similar view on the plane of the line 9—9 of Figure 7;

Figure 10 is a further enlarged fragmentary sectional view approximately on the plane of the line 10—10 of Figure 11;

Figure 11 is a fragmentary front elevational view of the jaws from the plane 11—11 of Figure 10, showing the jaws open;

Figure 12 is a view similar to Figure 10 showing the jaws closed;

Figure 13 is a similar view on another vertical plane;

Figures 14 and 15 are vertical sectional views approximately on the planes of the lines 14—14 and 15—15 of Figure 12, respectively;

Figure 16 is a greatly enlarged vertical sectional view on the plane of the line 16—16 of Figure 2; and Figure 17 is a detached perspective view of the embossing members.

For the purpose of illustrating the principles of the invention, it has been shown as embodied in a particular type of package and a method and apparatus for making it, but it should be understood that the invention is equally susceptible of use in the manufacture of other types of packages and in the crimp-sealing of sheets of material together for any purpose.

The package as shown comprises an envelope formed of two thin flexible ductile or pliant layers or sheets 1 and 2 of "cellophane," rubber hydrochloride, metal foil or the like that are sealed or bonded together, preferably thermoplastically, in zones 3 that form the margins or boundaries of one or more commodity compartments 4 between the layers in which commodities such as tablets 5 are enclosed. Preferably the sealed zone 3 along one edge of the envelope A is wider than said zone at the other edges as indicated at 6 for the purpose of attaching a cover or label B to the envelope.

This label or cover B is foldable around the envelope to unfold and protect it and also to receive printed matter such as advertising indicia. It is shown as formed of a single strip of material relatively heavier, stiffer and tougher than the material of which the envelope is formed, for example heavy paper or thin cardboard. This cover is folded at 7 around the edge of the marginal portion 6 of the envelope, with the main portion 8 of the cover lying along one side of the envelope and a narrow end portion 9 lying over the other side of the envelope as best shown in Figure 3; and the folded portion of the cover is secured to the marginal portion 6 in the manner to be hereinafter described thus to leave the edge of the narrow returned portion 9 free or in spaced relation to the bag so as to releasably receive the other end portion 10 of the cover when the cover is folded around the envelope, to hold said portion 10 against unfolding.

In accordance with the invention, the portions 8 and 9 of the cover B are sealed to the marginal portion 6 of the envelope A in a novel and improved manner to reduce to the minimum the possibility of accidental separation of the cover from the envelope, or vice versa and to ensure a maximum of support for and protection against injury of of the thin and flexible walled envelope A even when the latter contains relatively heavy or bulky commodities. The seal is preferably adhesive, either the layers 1 and 2 being thermoplastic or having thermoplastic or adhesive coatings, or the cover sheet B having a thermoplastic or adhesive coating; and the seal preferably includes a crimped zone 11 where the juxtaposed layers of material are interdigitated, and elongate spaced, parallel, uncrimped flat sealed zones 12 and 13, one at each of opposite edges of the crimped zone 11 as best shown in Figures 1 and 2.

These sealed zones may be formed in different ways, but a preferred method and means includes opposed sets of crimping teeth 14 and 15 one set being formed at one edge of a plate 16 and the other set being formed on the edge of another plate 17. The plates 16 and 17 are mounted in jaws or die blocks 18 with the teeth of one set disposed in alternate relation with the teeth of the other set so that the teeth of one set may intermesh with the teeth of the other set as best shown in Figures 12 and 14. The die blocks 18 are mounted for relative movement toward and from each other in known manner to cause the teeth to grip between them and crimp the layers of the envelope and the cover sheet as shown in Figures 3, 12 and 14. Preferably, the sides of the teeth extend transversely of and open through the sides of the respective plates 16 and 17 and are disposed at angles of 90° to each other with their ridges or angles of intersection in a common flat plane as indicated in Figure 11; and the ends of each tooth are beveled as indicated at 19 at angles of approximately 45°.

At opposite sides of each of the crimping plates 16 and 17 are flat sealing plates 20 which have flat smooth edge portions 21 that are disposed parallel to the plane of the tooth ridges intermediate the height of the teeth as shown best in Figure 11. The height of the teeth 14 and 15 is substantially greater than the aggregate thickness of the superposed layers of the envelope A and cover B, and depending somewhat on the nature of the material being sealed and crimped, the height of the teeth may be of the order of more or less than twice the aggregate of the thicknesses of said layers. The crimp-sealing plates 16 and 17 and the flat sealing plates 20 are mounted in the guide blocks or jaws 18 so that when the jaws are separated as shown in Figure 3, the superposed layers may be inserted freely between the teeth as shown in Figures 3, 8 and 11 while when the jaws are moved together the sealing surfaces 21 of the plates 20 will tightly press the layers of the envelope and cover together and at the same time while the layers are tightly held between the surfaces 21 of the presser plates 20 the teeth 14 and 15 will deeply interdigitate said layers as shown in Figures 12 to 15 to form the flat sealed zones 13 and the interdigitated zones 11. The inner corners of the plates 20 are rounded or beveled as shown at 22 so that the layers of the envelope and cover sheet are pressed between said corners and the beveled surfaces 19 of the teeth so as to draw and stiffen the portions of said layers between the flat sealed zones 12 and 13 and the interdigitated zone 11. The point or ridge of the tooth of one jaw enters the recess between two adjacent teeth of the other jaw so as to produce a rib-like protuberance 23 at one side of the interdigitated zone and a trough-like recess 24 at the other side of the interdigitated zone; and the corners 22 and the beveled surfaces 19 form a roughly trapezoidal inclined surface 25 on one face of the interdigitated zone and a roughly convex surface 26 at the other face of the interdigitated zone. The portions of the layers at the ends of the recesses and protuberances are disposed at approximately 45° to the general plane of the assembly of layers as indicated at 27. Thus, the layers 8 and 9 of the cover sheet and the layers of the marginal portion 6 of the envelope are firmly and securely interlocked in the interdigitated zone and the surfaces 25 and 26 reinforce and rigidify the seal at opposite edges of the interdigitated zone while the alternate rib-like protuberances 23 and trough-like depressions 24 rigidify the layers transversely of the interdigitated zone to resist strains applied transversely of said zone with a peeling action. The flat sealed zones 12 and 13 further resist such peeling action of the layers and the merging portions of the flat sealed zones and the interdigitated zone reinforce each other.

The flat sealed zone 13 is interposed between the interdigitated zone and the fold 7 of the cover so that there is no tendency of the interdigitations to cut or tear through said fold, and this flat sealed zone also provides an appropriate spot for the application to the package of suitable indicia such as code numbers. As shown in Figures 2, 7 and 9, this indicia comprises a plurality of numerals 28 that are embossed or pressed into the material of the cover at one side thereof so as to be visible from only that side. Conveniently a plurality of embossing element like type bars 29 are mounted in one of the jaws 18 while a platen element 30 is mounted in the other jaw. The flat sealing plate 20 at one side of each of the crimping plates 16 and 17 is formed of two sections 31, and the type elements 28 are arranged between said sections in one jaw while the platen 29 is arranged between the sections 31 of the other jaw as best shown in Figures 6 and 8. A leaf spring 32 is interposed between the platen 30 and the jaw 18 to permit the platen to yield under the pressure applied by the embossing members 29, and a suitable spring 33 is provided to hold the embossing members in close side by side contact with each other.

When the jaws 18 move together, the face of the embossing members 29 engage one layer of the cover while the platen engages the other side as shown in Figures 7 and 9, so that the indicia 34 on the faces of the embossing members are impressed into the material of the cover at the side thereof engaged by the embossing members. The other side of the cover is smooth as shown in Figures 1, 7 and 9. These impressed or embossed indicia also further interdigitate and strengthen the flat sealed zone in which they are formed.

It will thus be seen that the invention provides a seal between thin flexible layers of sheet material and substantially thicker, heavier and tougher layers of sheet material wherein portions of the layers are firmly and deeply interlocked and interdigitated and portions of the layers are mutually reinforced so as to reduce to the minimum the possibility of accidental separation or detachment of the sheets from each other; and that the invention further provides a combined crimped and flat seal wherein the crimped and flat portions are so related as to reinforce each other. Furthermore with the invention the layers can be simultaneously crimped and impressed or embossed with suitable indicia, rapidly, effectively and at minimum cost.

It will be understood by those skilled in the art that the sealing plates 16, 17 and 20 may be heated when desired and must be heated where a thermoplastic substance is involved in the seal, and any suitable heating means known in the art may be utilized.

I claim:

1. In a method of crimp-sealing together an assembly of layers of pliant material, the steps of tightly holding and flat pressing said layers together in elongate, spaced parallel zones and simultaneously drawing the portions of said layers between said zones from opposite faces of said assembly to form in each face of the assembly alternate trough-like recesses and rib-like protuberances transverse with respect to said spaced parallel zones and of a depth and height respectively of the order of twice the aggregate of the thicknesses of said layers and having common side walls and common end walls merging into said flat zones.

2. A seal for an assembly of superposed layers of sheet material having simultaneously crimped and flat-pressed portions providing two elongate spaced and parallel flat-pressed zones and a row of parallel trough-like recesses on one face of the assembly and a rib-like protuberance opposite each said recess on the opposite face of the assembly, with said recesses and protuberances between and transversely disposed with respect to said flat-pressed zones.

3. A seal as defined in claim 2 wherein said recesses and protuberances have common side walls and common end walls merging into said flat-pressed zones, said recesses are approximately V-shaped in cross section, each end wall has an inclined surface extending from one face of the assembly to the bottom of the corresponding recess and each end wall also has a convex surface on the other face of the assembly at the end of the corresponding protuberance, the depth of said recesses and the height of said protuberances are of the order of twice the aggregate of the thicknesses of said layers, and said layers are sealed together in said crimped and flat-pressed zones.

4. An apparatus for crimp-sealing together a plurality of superposed layers of pliant material comprising jaws having flat surfaces to engage and flat press said layers together in elongate spaced parallel zones, said jaws having toothed surfaces for drawing the portions of said layers between said zones from opposite faces of said assembly simultaneously with the flat pressing of said layers by said flat surfaces and for forming in each face of the assembly alternate trough-like recesses and rib-like protuberances transverse with respect to said parallel zones, the teeth of said toothed surfaces being of a height of the order of twice the aggregate of the thickness of said layers, said teeth having side surfaces that meet in an angular ridge and each tooth also having two converging end surfaces, whereby to form said trough-like recesses and rib-like protuberances with common side walls and common end walls merging into said flat zones.

5. An apparatus as defined in claim 4 wherein there are curved surfaces on said jaws between said flat surfaces and the end surfaces of said teeth, each curved surface being related to said end surfaces of the teeth of the opposite jaw so that when said jaws are closed with such layers of material between them the layers will be pressed between said curved surfaces and said end surfaces.

References Cited in the file of this patent

UNITED STATES PATENTS

| Number | Name | Date |
| --- | --- | --- |
| 795,359 | Moore | July 25, 1905 |
| 1,460,391 | Satenstein | July 3, 1923 |
| 2,200,971 | Sonneborn et al. | May 14, 1940 |
| 2,248,038 | Adams et al. | July 8, 1941 |
| 2,457,924 | Salfisberg | Jan. 4, 1949 |